United States Patent
Stevens et al.

(10) Patent No.: US 7,704,420 B2
(45) Date of Patent: Apr. 27, 2010

(54) SPRAYING DEVICE AND METHOD FOR FLUIDISED BED GRANULATION

(75) Inventors: Rob Stevens, Schinveld (NL); Luc Vanmarcke, Lembeke (BE); Roeland Elderson, Axel (NL)

(73) Assignee: Yara International ASA, Oslo (NO)

( * ) Notice: Subject to any disclaimer, the term of this patent is extended or adjusted under 35 U.S.C. 154(b) by 676 days.

(21) Appl. No.: 10/583,380

(22) PCT Filed: Dec. 23, 2003

(86) PCT No.: PCT/NO03/00440

§ 371 (c)(1),
(2), (4) Date: Apr. 19, 2007

(87) PCT Pub. No.: WO2005/061118

PCT Pub. Date: Jul. 7, 2005

(65) Prior Publication Data

US 2007/0200007 A1     Aug. 30, 2007

(51) Int. Cl.
*B29B 9/00* (2006.01)
(52) U.S. Cl. ............................................. 264/12; 425/7
(58) Field of Classification Search ....................... None
See application file for complete search history.

(56) References Cited

U.S. PATENT DOCUMENTS

| | | |
|---|---|---|
| 3,927,974 A | 12/1975 | Johansson et al. |
| 3,979,069 A | 9/1976 | Garofalo |
| 4,555,059 A | 11/1985 | Collins et al. |
| 4,619,843 A | 10/1986 | Mutsers |
| 4,701,353 A | 10/1987 | Mutsers et al. |
| 5,272,820 A * | 12/1993 | Ito et al. ........................ 34/585 |
| 5,437,889 A * | 8/1995 | Jones .......................... 427/185 |
| 5,653,781 A | 8/1997 | Kayaert et al. |

FOREIGN PATENT DOCUMENTS

| | | |
|---|---|---|
| EP | 1 097 899 | 6/2003 |
| FR | 2 522 991 | 9/1983 |

* cited by examiner

*Primary Examiner*—Mary Lynn F Theisen
(74) *Attorney, Agent, or Firm*—Wenderoth, Lind & Ponack, L.L.P.

(57) ABSTRACT

A spraying device for melt granulation in a fluidized bed including a nozzle (2) with a feed channel for a liquid to be atomized, where the liquid is led through an emulsifying device and into an internal mixing chamber for gas and liquid, before it is fed to the fluidized bed. The nozzle has a separate channel for the atomizing gas fitted concentrically around the central liquid supply channel for the liquid to be atomized or nebulized. The mixing chamber surrounds the outlet zone of the liquid spray from the emulsifying device and the gas, allowing efficient mixing of high speed atomization gas and liquid, and having an external gas cap (1) where fluidization gas is channelled into a spout above the spraying device.

13 Claims, 4 Drawing Sheets

SPRAYING DEVICE AND METHOD FOR FLUIDISED BED GRANULATION

BACKGROUND OF THE INVENTION

1. Technical Field

The invention concerns a spraying device for use in high capacity fluid bed granulation and a method for preparation of solid granules from a liquid material in a fluid bed.

More specifically, this invention relates to spray nozzles usable for supplying granule-growth liquid, by atomizing the liquid in a fluidized bed of solid particles where upon the microscopic liquid drops are sprayed.

2. Description of the Related Art

The fluidized bed granulation process originally designed by Nederlandse Stikstof Maatschappij[r], later known as the NSM and now the HFT (Hydro Fertilizer Technology) granulator, has proved to have great advantages over other processes for granulating fertilizer substances like urea and ammonium nitrate, see for example U.S. Pat. No. 5,653,781. The HFT granulation process combines very high capacity with excellent product properties and low energy consumption. In achieving this, the way of spraying the liquid to be granulated into the fluidized bed is of the highest importance. The design of the nozzles where the liquid is atomized influence the liquid flow capacity—and thus the capacity of the granulator—as well as the pressure and volume flow of atomization gas required to maintain spouts with continuous and uniform sprays without agglomeration and unwanted disturbance of the fluidized bed. Finally the nozzle design also influences the energy consumption of the granulator through its flow and pressure characteristics.

State-of-the-art spraying devices (nozzles) are generally of the binary type atomizing nozzles, where a gas, e.g. air, is used to atomize the liquid to be granulated. In principle the gas and liquid may be introduced through the nozzle in the same single tube, or gas and liquid may be introduced separately through for example concentric tubes so that the mixing takes place only in and after the nozzle aperture. The principle aims are effective gas-liquid mixing; uniform and small size of liquid particles and a suitable geometry of the resulting spray or spout, so that the atomized liquid (microscopic droplets) is continuously and homogenously accreted on the granules formed in the fluidized bed.

Most nozzle designs available are not designed for use in high capacity granulation. Nozzles for granulation must be able to handle concentrated solutions (up to 99%) or melts without clogging or other problems ruining the production process. At the same time, there are notable differences between different designs with regard to energy consumption of the process, capacity (product throughput) and quality of the formed granules. Existing and previous nozzle types need relatively high levels of atomization gas, at elevated pressures, which again means high energy consumption.

Nozzles for use in a granulation process are for example described in U.S. Pat. No. 4,701,353. These have a central channel through which the liquid material is supplied, and a channel concentric therewith carrying a powerful gas stream. The liquid is passed through a rotation chamber before it is mixed with the gas stream. The nozzle may also have a concentric outer channel for providing a less energy-rich gas stream. However, this nozzle design has limitations in liquid flow capacity and in the energy required for both nebulizing or atomizing the liquid into suitable droplets and at the same time fluidizing the droplets into a properly shaped spout where the particle growth will occur. The rotation chamber described in U.S. Pat. No. 4,701,353 will only serve to give the liquid a helical movement, while the mixing chamber of the novel device described below will allow a thorough mixing of the atomizing gas and liquid before the spray leaves the exit aperture of the nozzle. Thereby the kinetic energy from the gas and liquid is utilized optimally. The novel device and method described herein demonstrate high granulation capacity and low energy consumption; several times better than the values quoted in U.S. Pat. No. 4,701,353. In cases where a second concentric gas tube is fitted on the nozzle, like described in claim 5 of U.S. Pat. No. 4,701,353, such design complicates the device unnecessarily compared to the device described below, since the novel device and method makes use of a portion of the fluidization gas supply for the extra spout gas channelled up around the nozzle.

International patent application WO 02083320 also describes a nozzle for use in fluid bed granulators. It has a central supply for liquid where the liquid thereafter is led through a swirling device and into an internal mixing chamber. Gas is supplied to the mixing chamber through a plurality of openings in the wall in the lower part of the mixing chamber. However, the description reveals no examples and no figures relating to the practical applicability of the described design, whereas the novel device and method described below has proved itself through high production capacity, good product quality properties and low energy consumption, in comparison with any other previously described designs.

The object of the invention is to obtain a granulation process with reduced energy consumption and enhanced granulation capacity; both factors reducing the variable costs of the granulation step. Another object is to obtain granules of better quality. These objects of the invention are obtained with the device and method as described below, and the invention is further defined and characterized by the accompanying patent claims.

SUMMARY OF THE INVENTION

The present invention thus concerns a spraying device for melt granulation in a fluidized bed comprising a nozzle with a feed channel for a liquid to be atomized, where the liquid is led through emulsifying means and into an internal mixing chamber for gas and liquid, before it is fed to the fluidized bed. The nozzle has a separate channel for the atomizing gas fitted concentrically around the central liquid supply channel for the liquid to be atomized or nebulized. The mixing chamber surrounds the outlet zone of the liquid spray from the emulsifying means and the gas, allowing efficient mixing of high speed atomization gas and liquid, and having an external gas cap where fluidization gas is channelled into a spout above the spraying device. The mixing chamber could be cylindrical with an upper conical part or conical. The length/diameter ratio L/D of the mixing chamber should be within the range 0.5 to 5 and the l/d ratios in the range 0.1 to 2. Preferably the ratio L/D of the mixing chamber is in the range 1 to 4 and the l/d ratios in the range 0.25 to 1.

The gas cap is conical and fitted to a perforated bottom plate, concentrically around the nozzle. The gas cap should have a height of 10 to 200 mm above the bottom plate (3), preferably 20 to 100 mm. The upper aperture diameter of the gas cap is 20 to 150 mm and the bottom aperture diameter of 30 to 300 mm, preferably 35 to 100 mm and 40 to 200 mm, respectively.

The invention also concerns a method for preparation of solid granules in a fluidized bed, where a liquid material is atomized by supply of an atomizing gas and sprayed into the fluidized bed through spray nozzles mounted vertically and where the fluidized bed is maintained by fluidization gas blown upwards through a perforated plate underneath the bed. A portion of the fluidization gas should be channelled through a gas cap surrounding the nozzle for creation of a gas spout above the spraying device.

The invention also concerns a method for preparation of solid granules from a liquid material in a fluidized bed by using a nozzle with a feed channel for a liquid to be atomized. The liquid is led through emulsifying means and into an internal mixing chamber for gas and liquid, before spraying the atomized liquid upwardly into the fluid bed layer. The atomizing gas is led through a channel concentrically to the liquid supply and into the mixing chamber surrounding the outlet openings for both liquid and gas, allowing efficient mixing of high speed atomization gas and liquid. A portion of the fluidization gas is channelled through a gas cap surrounding the nozzle for creating a gas spout above the spraying device.

The spraying device could be used for production of granules of urea, and other fertilizer products, such as calcium ammonium nitrate, ammonium nitrate, ammonium sulphate and mixtures thereof.

BRIEF DESCRIPTION OF THE DRAWINGS

The invention will be further explained with reference to the accompanying drawings, wherein.

DETAILED DESCRIPTION OF THE INVENTION

In a granulation process the liquid is sprayed into a fluidized bed through spray nozzles mounted vertically and spraying the atomized liquid upwardly into the fluid bed layer. The fluidized layer is maintained by fluidization gas blown upwards through a perforated plate underneath the bed. The nozzles are placed in openings in this plate with their apertures a given distance, e.g. 5-100 mm, above the plate.

The design of the nozzles where the liquid is atomized influences the liquid flow capacity and thus the capacity of the granulator. It also influences the pressure and volume rate of atomization gas required to maintain spouts with continuous and uniform sprays, without unwanted agglomeration and disturbance of the fluidized bed. Finally the nozzle design also influences the energy consumption of the granulator through its gas flow characteristics. This has a direct impact on the variable costs of the operation. The nozzle should atomize the liquid into droplets at desired size, approximately 50-100 micron for a single phase melt. At the same time the nozzle should evaporate some of the water, without creating premature solidification. It should also distribute and deliver droplets into the bed at the same time as it should contribute to movement around the nozzle and mass exchange in the bed.

The main novelty of the invention is the use of low energy fluidization gas to replace a large portion of the high-pressure atomization gas required. This is achieved by channelling the fluidization gas through a specially designed gas cap surrounding the nozzle, thus creating a gas spout. A novel mixing chamber upstream from the nozzle aperture improves the internal mixing of gas and liquid in the atomization process in the nozzle.

Splitting the gas in two tailored functions gives freedom to split the four key functions in atomization and movement.

Atomization

1) The atomization is done with minimum energy consumption, sufficient to create droplets and deliver them into the bed.

2) The desired evaporation rate can be tailored, according to the properties of the melt, being water content, heat of crystallization, sub-cooling properties and crystallization curve.

Impact

3) The droplet transport and spout shape is tailored to the geometrical dimensions of the bed, where bed depth is a key.

4) The impact is also tailored to give mass transport of seed particles into the spout area.

The present invention has effected that the granule quality characteristics and granulation capacity may be maintained or even improved, while energy consumption is considerably reduced, compared to those nozzles hitherto used in granulation. The reduced energy consumption is obtained because the atomization gas can be operated at lower pressure, without increasing the total amount of fluidization gas. This design still allows a high melt throughput and excellent physical characteristics of the granules.

Figure 1:
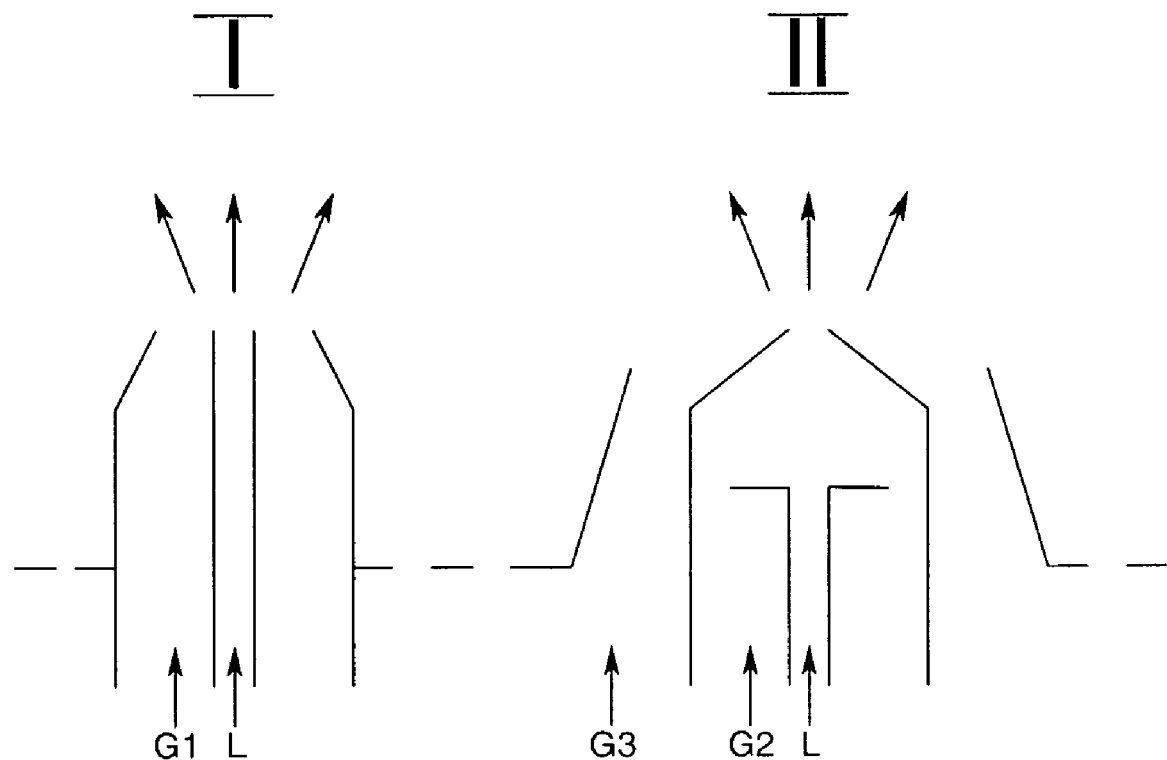
FIG. 1 shows the principle difference between a prior art design and the novel nozzle design.

In FIG. 1 the principle difference between prior art design and the novel design of this invention is shown. In prior art design (case I) mixing of liquid (L) and atomization gas (G1) takes place in the fluid bed by the external impact of gas (G1) on the liquid (L). In the new nozzle design (case II) an internal mixing of gas (G2) and liquid (L) takes place in a mixing chamber. At the same time a part of the atomization gas is replaced by fluidization gas (G3) led into a spout in the fluid bed by the novel gas cap mounted concentrically outside the nozzle. Part of the atomization gas is thus replaced by fluidization gas (G3) supplied via the gas cap. The required amount of atomization gas has been reduced drastically compared with the known nozzle designs, as will be illustrated by the examples (from 80-250 kg/h to 32 kg/h).

Figure 2:
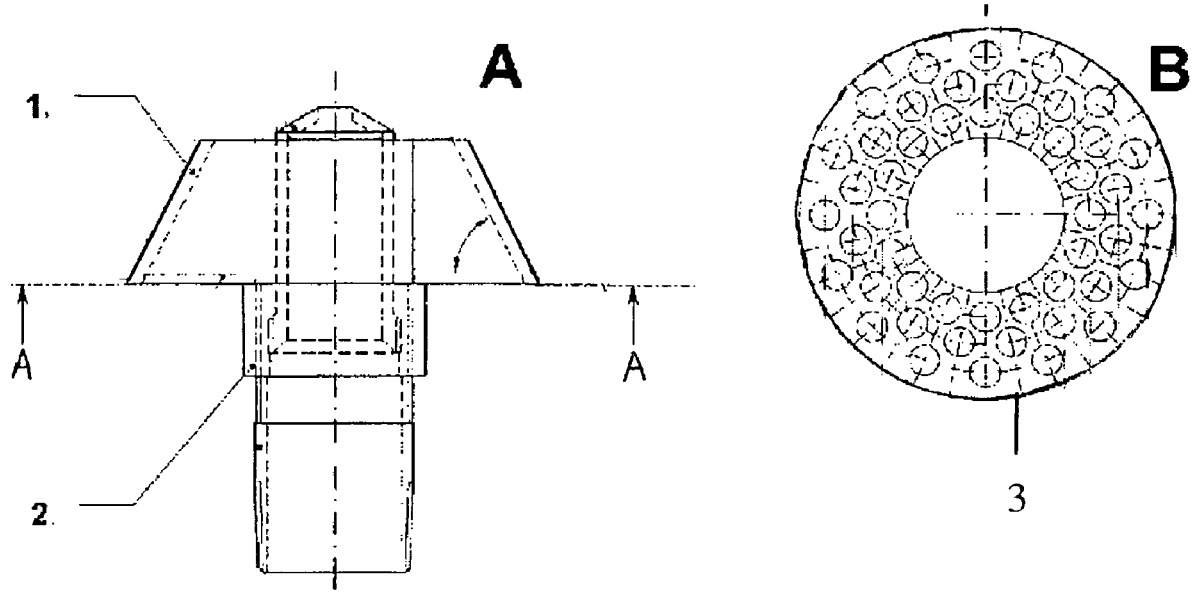
FIG. 2 shows a gas cap and a position of the gas cap concentrically outside the nozzle.

In FIG. 2A the design of the gas cap and position of gas cap concentrically outside the nozzle is shown. FIG. 2B shows a horizontal section along line A-A. The conically shaped gas cap 1 is mounted concentrically around the nozzle 2 on a perforated sieve plate 3 and exposed to fluidization gas. The top diameter of the gas cap device is smaller than the bottom diameter, and there is clearance for gas passage between the outer nozzle wall and the gas cap. The amount of gas through the gas cap shall be sufficient to create a viable spout into the granulator bed. The velocity of gas through the gas cap is determined by the horizontal area between nozzle and gas cap, the upper diameter of the gas cap aperture and the diameter of the bottom inlet of the gas cap. The mass flow of fluidization gas per square meter horizontal bed area remains almost unchanged from the known designs.

Figure 3:
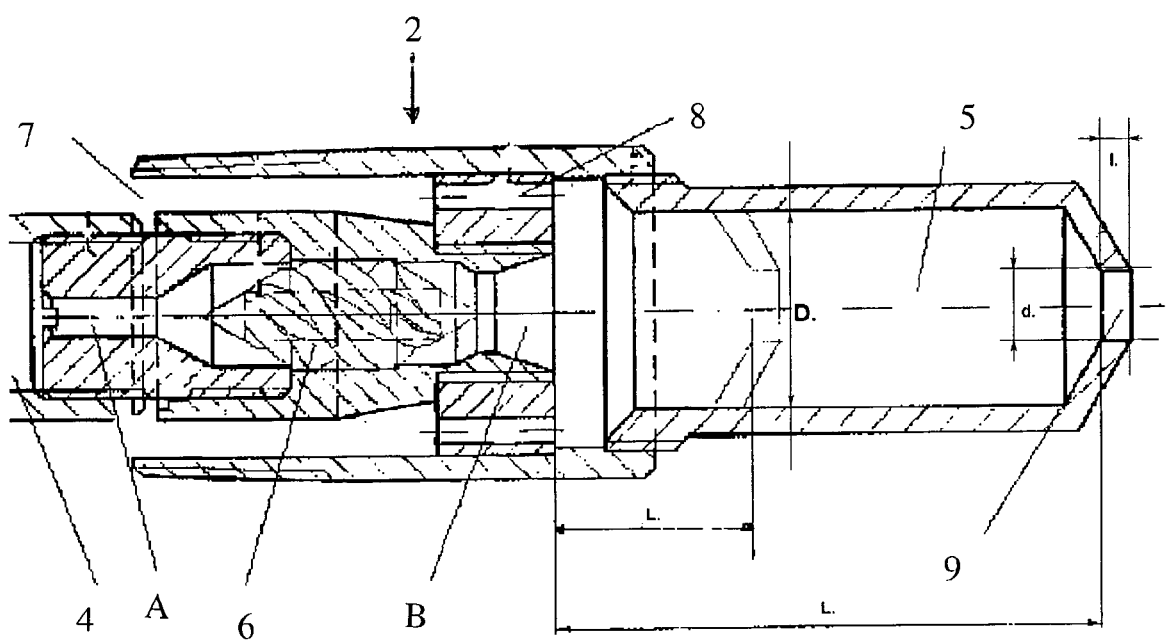
FIG. 3 shows a nozzle with a cylindrical mixing chamber.

FIG. 3 shows the new nozzle design with cylindrical mixing chamber. The ratio length: diameter (L/D) of the mixing chamber could be varied as indicated in the drawing. Omitted from the figure are feed lines, the perforated bottom plate of the granulator and the conical cap mounted concentrically to the nozzle on the bottom plate. The nozzle 2 is composed of a central channel 4 which at one end A connects with a liquid line omitted from the drawing and at the other end B leads into a mixing chamber 5. In a position between openings A and B a swirling device 6 is mounted inside to bring the feed via A in helical motion at point B. Further, the spraying device is provided with a channel 7 which has been fitted concentrically around the central liquid supplying channel 4. Channel 7 being at one end connected to a gas line omitted from the drawing and at the other end provided with 5-15 round holes 8, which lead into the mixing chamber 5. The two continuous flows are fed inside the mixing chamber at the same time; a granule's growth liquid through opening B and a gas flow via 8. In this mixing chamber a gas in liquid emulsion can be generated. Expansion through the orifice opening 9 converts the emulsion to droplets of 50-100 μm diameter, which are suitable for granule growth in the fluidized bed.

Figure 4:
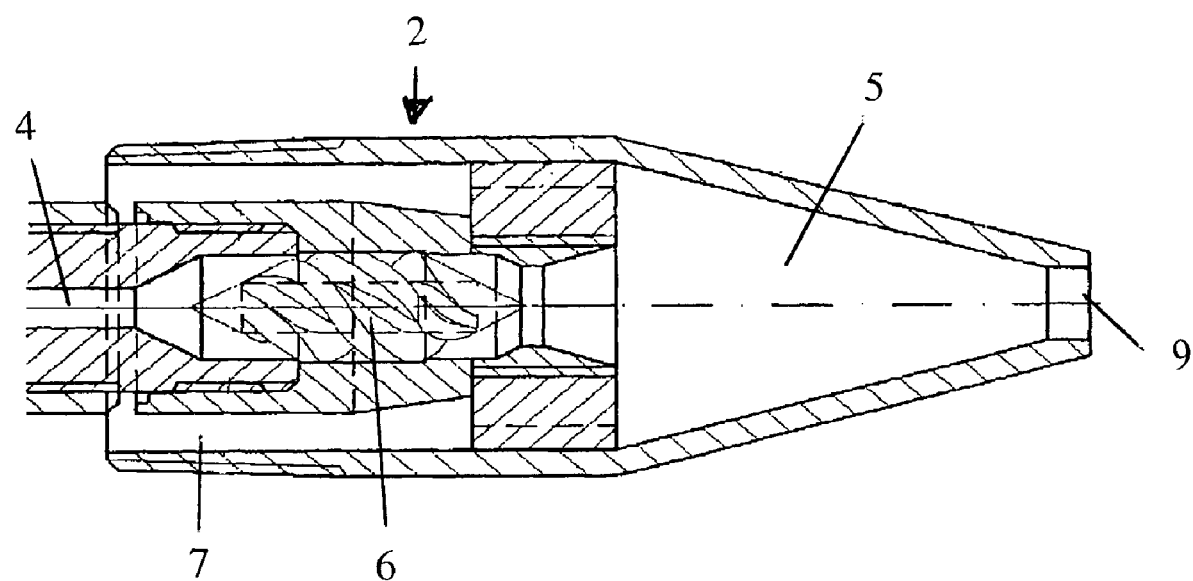
FIG. 4 shows a nozzle with a conical mixing chamber.

FIG. 4 shows a nozzle with a conical mixing chamber 5. The other parts of the nozzle are the same as in FIG. 3.

From the literature (Lefebvre A. H.: Atomization and sprays, Taylor & Francis, 1989, p-214-215 an p-232, (ISBN: 0-89116-603-3), it seems that the l/d (length/diameter) of the orifice and the ratio of the L/D (length/diameter) of a mixing chamber are important factors for the formation of the liquid droplets. Based on these assumptions and our own findings, the L/D ratio should be in the range 0.5 to 5, and the l/d ratio in the range 0.1 to 2 in order to efficiently obtain droplets with an average diameter less then 100 μm. Preferably L/D should range from 1 to 4 and l/d from 0.25 to 1.

Energy efficiency has also been calculated for the new design nozzles. Standard and common equations are used; see Perry's Chemical Engineers' Handbook (chapter thermodynamics).

$$W = \phi_M * Cp * \Delta T \quad [kJ/s] \Delta T = T_2 - T_1 \quad \text{and} \quad T_2 = T_1 * (p_2/p_1)^{(k-1/k)} \quad [K]$$

$\phi_M$=mass flow of melt
$C_p$=specific heat of gas [kJ/K·kg]
$T_1$=ambient temperature
$T_2$=temperature after fan
$p_1$=gas pressure before fan
$p_2$=gas pressure after fan
k=gas constant For the calculations the following assumptions were made:
Adiabatic conditions
Ambient air temperature: 25° C.
Pressure loss: 5000 Pa
Fan efficiency: 0.80

According to the calculations it is possible to reduce the energy consumption of the fluidization and atomization air supply by about 50%. The energy reduction that actually is achieved using the novel spraying device is shown in Example 1 below.

The parameters moisture content, density and crushing strength of urea granules produced with the novel nozzle design have comparable or better values compared to granules produced with existing designs. This is illustrated in examples below.

It has experimentally been found that when using an internal gas/liquid mixing chamber nozzle instead of an external gas/liquid-mixing nozzle, it is possible to make granules with better chemical and physical properties, with less energy consumption.

In granulation units, especially for urea and ammonium nitrate, it has also been an important aim to reach high production capacities, avoiding the need to have more than one single granulation unit per synthesis unit, while minimizing variable costs.

The invention will be further illustrated by the following examples describing granulation of urea. The examples will demonstrate values obtained for product quality parameters as well as energy consumptions for a range of nozzles based on the novel design.

The examples were carried out under the conditions given below:

A granulator was fit with the experimental nozzle in the center. The conical gas cap had a lower diameter of 105 mm and an upper diameter of 50 mm. It was mounted on a 4.5% opening perforated sieve plate containing holes of 2 mm in diameter. The amount of air through this gas cap was 248 Nm³/h under a feed pressure equal to the fluidization gas (air) pressure of about 800 mmwc and with a temperature of 40° C. The granulations were carried out under normal standard urea granulation conditions with a melt of 96% urea containing 0.55 wt. % formaldehyde, with a temperature of about 132° C. The set-up was supplied with fluidization gas necessary to keep the bed in movement and also for creating a spout via the gas cap 'spout opening'. The atomization gas with a flow rate of 32 kg/h and a temperature of 142° C. was supplied together with the melt into the nozzle's mixing chamber.

Product quality parameters such as moisture content, density, crushing strength of the granules with diameter 2.5-4.5 mm were analyzed for each nozzle test. During the test different liquid flows have been used; 250, 350 and 450 l/h. Each granulation test was at least carried out in duplicate.

It is also possible to produce nitrate products with 33.5% N and 27% N with this kind of nozzle.

EXAMPLE 1

Nozzle With Cylindrical Mixing Chamber L/D=2.75

In this example it has been used a spraying device of type H5 as shown in FIG. 3, with L/D ratio 2.75 of the mixing chamber. The results are compared with experiments carried out in nozzles of prior art design.

TABLE 1

Operating parameters

| Nozzle | | HFT design (prior art) | | Novel design L/D = 2.75 | |
|---|---|---|---|---|---|
| | | Ex. A | Ex. B | Ex. A | Ex. B |
| Urea feed flow | kg/h | 540 | 450 | 540 | 454 |
| Urea feed pressure | bar | 1.4 | 1.3 | 2.1 | 1.8 |
| Fluidisation gas (air) flow | kg/m²·h | 7952 | 7952 | 8107 | 8107 |
| Fluid. gas (air) pressure | mmwc | 800 | 800 | 800 | 800 |
| | bar | 0.08 | 0.08 | 0.08 | 0.08 |
| Spout. gas (air) flow | kg/h | — | — | 320 | 320 |
| Atom. gas (air) flow | Nm³/h | 252 | 252 | 32 | 32 |
| Atom. gas (air) pressure | bar | 0.5 | 0.5 | 1.9 | 1.5 |

TABLE 2

Obtained product properties, urea

| Nozzle | | HFT design (prior art) | | Novel design L/D = 2.75 | |
|---|---|---|---|---|---|
| | | Ex. A | Ex. B | Ex. A | Ex. B |
| Moisture | % | 0.26 | 0.23 | 0.20 | 0.19 |
| Density | kg/l | 1.216 | 1.23 | 1.237 | 1.25 |
| Crushing strength | kg | 4.40 | 4.44 | 4.95 | 5.03 |
| Abrasion | mg/kg | 800 | 650 | 175 | 195 |

TABLE 3

Power consumption

| Nozzle | HFT design (prior art) | Novel design L/D = 2.75 Experiment A |
|---|---|---|
| Power consumption ($W_T$) (kWh per tonne product) | 27 | 13 |

The power consumption is calculated as described in the description. Air is used as fluidization and atomization gas, hence the k=1.40 and Cp=1.04 corrected for humidity of the air.

EXAMPLE 2

Nozzle With Cylindrical Mixing Chamber L/D=1

The working principle and design is with exception of the mixing chamber length the same as described in example 1. In this design the length of the mixing chamber is 20 mm instead of 55 mm so that the L/D ratio changed from 2.75 to 1. The results are compared with experiments carried out in nozzles of prior art design.

TABLE 4

Operating parameters

| Nozzle | | HFT design (prior art) | | Novel design |
|---|---|---|---|---|
| | | Ex. A | Ex. B | L/D = 1 |
| Urea feed flow | kg/h | 540 | 450 | 450 |
| Urea feed pressure | bar | 1.4 | 1.3 | 1.8 |
| Fluid. gas (air) flow | kg/m² · h | 7952 | 7952 | 8107 |
| Fluid. gas (air) pressure | mmwc | 800 | 800 | 800 |
| | bar | 0.08 | 0.08 | 0.08 |
| Spout. gas (air) flow | kg/h | — | — | 320 |
| Atom. gas (air) flow | kg/h | 252 | 252 | 32 |
| Atom. gas (air) pressure | bar | 0.5 | 0.5 | 1.5 |

TABLE 5

Obtained product properties, urea

| Nozzle: | | HFT design (prior art) | | Novel design |
|---|---|---|---|---|
| | | Ex. A | Ex. B | L/D = 1 |
| Moisture | % | 0.26 | 0.23 | 0.18 |
| Density | kg/l | 1.216 | 1.23 | 1.24 |
| Crushing strength | kg | 4.40 | 4.44 | 4.75 |
| Abrasion | mg/kg | 800 | 650 | 140 |

EXAMPLE 3

Nozzle With Conical Mixing Chamber

In this example it has been used a spraying device with conical mixing chamber as shown in FIG. 4. The L/D ratio of the nozzle was 2.75. The results are compared with experiments carried out with nozzles of prior art design.

This mixing chamber nozzle with conical shape has also 12 inlet gas openings (D), which are placed, in an angle directed towards the rotational direction of the liquid swirl. It is constructed to give the atomization gas a rotation in opposite direction to the liquid, in order to make a maximum impact of gas into the liquid flow.

TABLE 6

Operating parameters

| | | HFT design (prior art) | | Novel design |
|---|---|---|---|---|
| Nozzle: | | Ex. A | Ex. B | Conical |
| Urea feed flow | kg/h | 540 | 450 | 375 |
| Urea feed pressure | bar | 1.4 | 1.4 | 1.9 |
| Fluid. gas (air) flow | kg/m² · h | 7952 | 7952 | 8107 |
| Fluid. gas (air) pressure | mmwc | 800 | 800 | 800 |
| | bar | 0.08 | 0.08 | 0.08 |
| Spout. gas (air) flow | kg/h | — | — | 320 |
| Atom. gas (air) flow | kg/h | 252 | 252 | 32 |
| Atom. gas (air) pressure | bar | 0.5 | 0.5 | 1.7 |

TABLE 7

Obtained product properties, urea

| | | HFT design (prior art) | | Novel design |
|---|---|---|---|---|
| Nozzle: | | Ex. A | Ex. B | Conical |
| Moisture | % | 0.26 | 0.23 | 0.21 |
| Density | kg/l | 1.216 | 1.23 | 1.20 |
| Crushing strength | kg | 4.40 | 4.44 | 4.51 |
| Abrasion | mg/kg | 800 | 650 | 1430 |

By use of the new nozzle design in a granulation process it is possible to produce granules at lower energy consumption, with better quality and at an increased capacity.

The invention claimed is:

1. A spraying device for melt granulation in a fluidized bed, the spraying device comprising:
    a nozzle with a central liquid supply channel for a liquid to be atomized, where the liquid is led through emulsifying means and into an internal mixing chamber for gas and liquid, before it is fed to the fluidized bed; and
    an external gas cap surrounding the nozzle,
    wherein the nozzle has a separate channel for the atomizing gas fitted concentrically around the central liquid supply channel for the liquid to be atomized, and wherein the internal mixing chamber surrounds an outlet zone of the liquid spray from the emulsifying means and the gas, thereby allowing efficient mixing of high speed atomization gas and liquid, and fluidization gas is channeled through the external gas cap into a spout above the spraying device.

2. A spraying device according to claim 1, wherein the mixing chamber is cylindrical with an upper conical part.

3. A spraying device according to claim 2, wherein the upper conical part terminates in an orifice, and the ratio between the length (L) and the diameter (D) of the mixing chamber is in the range of 0.5 to 5 and the ratio of the length (l) and the diameter (d) of the orifice is in the range of 0.1 to 2.

4. A spraying device according to claim 2, wherein the upper conical part terminates in an orifice, and the ratio of the length (L) and the diameter (D) of the mixing chamber is in the range of 1 to 4 and ratio of the length (l) and the diameter (d) of the orifice is in the range 0.25 to 1.

5. A spraying device according to claim 1, wherein the mixing chamber is conical.

6. A spraying device according to claim 1, wherein the gas cap is conical and fitted to a perforated bottom plate, concentrically around the nozzle.

7. A spraying device according to claim 6, wherein the gas cap has a height of 10 to 200 mm above the bottom plate.

8. A spraying device according to claim 6, wherein the gas cap has a height of 20 to 100 mm above the bottom plate.

9. A spraying device according to claim 6, wherein the gas cap has an upper aperture diameter of 20 to 150 mm and a bottom aperture diameter of 30 to 300 mm.

10. A spraying device according to claim 6, wherein the gas cap has an upper aperture diameter of 35 to 100 mm and a bottom aperture diameter of 40 to 200 mm.

11. A method for preparation of solid granules in a fluidized bed, the comprising:
    atomizing a liquid material by supplying an atomizing gas and spraying the atomized liquid material into the fluidized bed through a vertically mounted spray nozzle; and
    blowing a fluidization gas upwards through a perforated plate disposed underneath the bed, wherein the fluidized bed is maintained by the fluidization gas blown upwards through the perforated plate,
    wherein a portion of the fluidization gas is channeled through a gas cap surrounding the nozzle for creation of a gas spout above the nozzle and the gas cap.

12. A method for preparation of solid granules from a liquid material in a fluidized bed, the method comprising:
    feeding a liquid to be atomized to a central liquid supplying channel of a nozzle, wherein the liquid is led through an emulsifying means disposed inside the central liquid supplying channel and into an internal mixing chamber for gas and the liquid, before the liquid is atomized and sprayed upwardly into the fluidized bed layer;
    supplying atomizing gas to the mixing chamber through a channel concentrically disposed relative to the central liquid supplying channel and into the mixing chamber surrounding outlet openings for both the liquid and the gas, thereby allowing efficient mixing of high speed atomization gas and the liquid; and
    channeling a portion of a fluidization gas through a gas cap that surrounds the nozzle, thus creating a gas spout above the gas cap and nozzle.

13. A method for preparation of granules of urea, calcium ammonium nitrate, ammonium nitrate, ammonium sulphate and mixtures thereof, the method including spraying an atomized liquid into a fluidized bed layer with the spraying device according to claim 1.

* * * * *